(12) United States Patent
Medendorp et al.

(10) Patent No.: US 12,030,132 B2
(45) Date of Patent: Jul. 9, 2024

(54) BEAM DELIVERY SYSTEM, METHOD, TRAIN AND TRANSPORT SYSTEM

(71) Applicant: Laser Precision Solutions B.V., Amsterdam (NL)

(72) Inventors: Harm Medendorp, Haarlem (NL); Tim Bernardus Maria Van Leent, Munich (DE); Timon Daniel Berrier, Amsterdam (NL)

(73) Assignee: LASER PRECISION SOLUTIONS B.V., Amsterdam (NL)

( * ) Notice: Subject to any disclaimer, the term of this patent is extended or adjusted under 35 U.S.C. 154(b) by 765 days.

(21) Appl. No.: 17/062,131

(22) Filed: Oct. 2, 2020

(65) Prior Publication Data
US 2021/0107090 A1 Apr. 15, 2021

(30) Foreign Application Priority Data
Oct. 4, 2019 (NL) .................................. 2023968

(51) Int. Cl.
*B23K 26/046* (2014.01)
*B23K 26/06* (2014.01)
*B23K 26/14* (2014.01)

(52) U.S. Cl.
CPC ........ *B23K 26/046* (2013.01); *B23K 26/0643* (2013.01); *B23K 26/0648* (2013.01); *B23K 26/1476* (2013.01)

(58) Field of Classification Search
CPC .............. B26K 26/046; B26K 26/0643; B26K 26/0648; B26K 26/1476
(Continued)

(56) References Cited

U.S. PATENT DOCUMENTS 3,696,230 A 10/1972 Friedrich
2003/0197909 A1 10/2003 Beyer et al.
(Continued)

FOREIGN PATENT DOCUMENTS

CN 202577076 U 12/2012
CN 106956080 A 7/2017
(Continued)

OTHER PUBLICATIONS

Search Report dated Jul. 21, 2020 and Written Opinion issued in corresponding Netherlands Patent Application No. 2023968 (9 total pages).
(Continued)

*Primary Examiner* — Vy T Nguyen
(74) *Attorney, Agent, or Firm* — Pillsbury Winthrop Shaw Pittman, LLP

(57) ABSTRACT

A beam delivery system including a shield which includes at least one beam passage for transmission of at least one laser beam; an optics assembly configured to at least partly focus the at least one laser beam on the at least one beam passage; and means for providing a fluid flow through the at least one beam passage. Also provided is a train and a transport system, as well as a beam delivery method that includes: transmitting at least one laser beam through a respective at least one beam passage of a shield; at least partly focusing the at least one laser beam on the at least one beam passage; and providing a fluid flow through the at least one beam passage.

16 Claims, 6 Drawing Sheets

(58) Field of Classification Search
USPC .......................................................... 219/121
See application file for complete search history.

(56) References Cited

U.S. PATENT DOCUMENTS

| | | | |
|---|---|---|---|
| 2008/0017801 A1* | 1/2008 | Fomenkov | H05G 2/006 250/354.1 |
| 2019/0255652 A1 | 8/2019 | Izumi | |

FOREIGN PATENT DOCUMENTS

| | | |
|---|---|---|
| EP | 1629935 A1 | 3/2006 |
| JP | 60-027487 A | 2/1985 |

OTHER PUBLICATIONS

D. Hoffmann et al., "Hochgeschwindigkeits-Reinigung von Schienenoberflachen mittels Laserstrahlung/High-Speed Cleaning of Rail Surfaces by Laser Radiation", Eb-Elektrische Bahnen, Div-Deutscher, Aug. 1, 2004, XP-001201814, pp. 383-388.

* cited by examiner

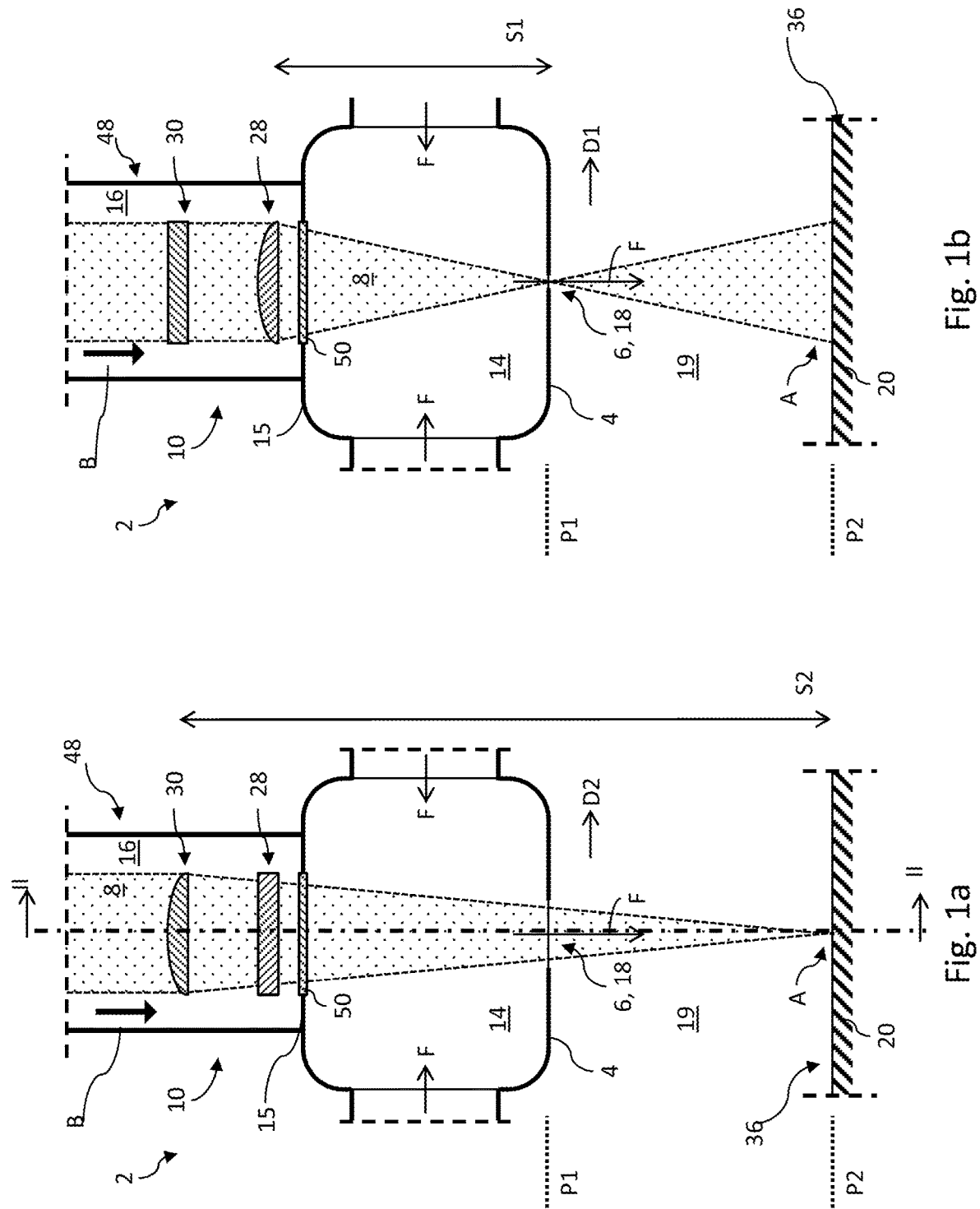

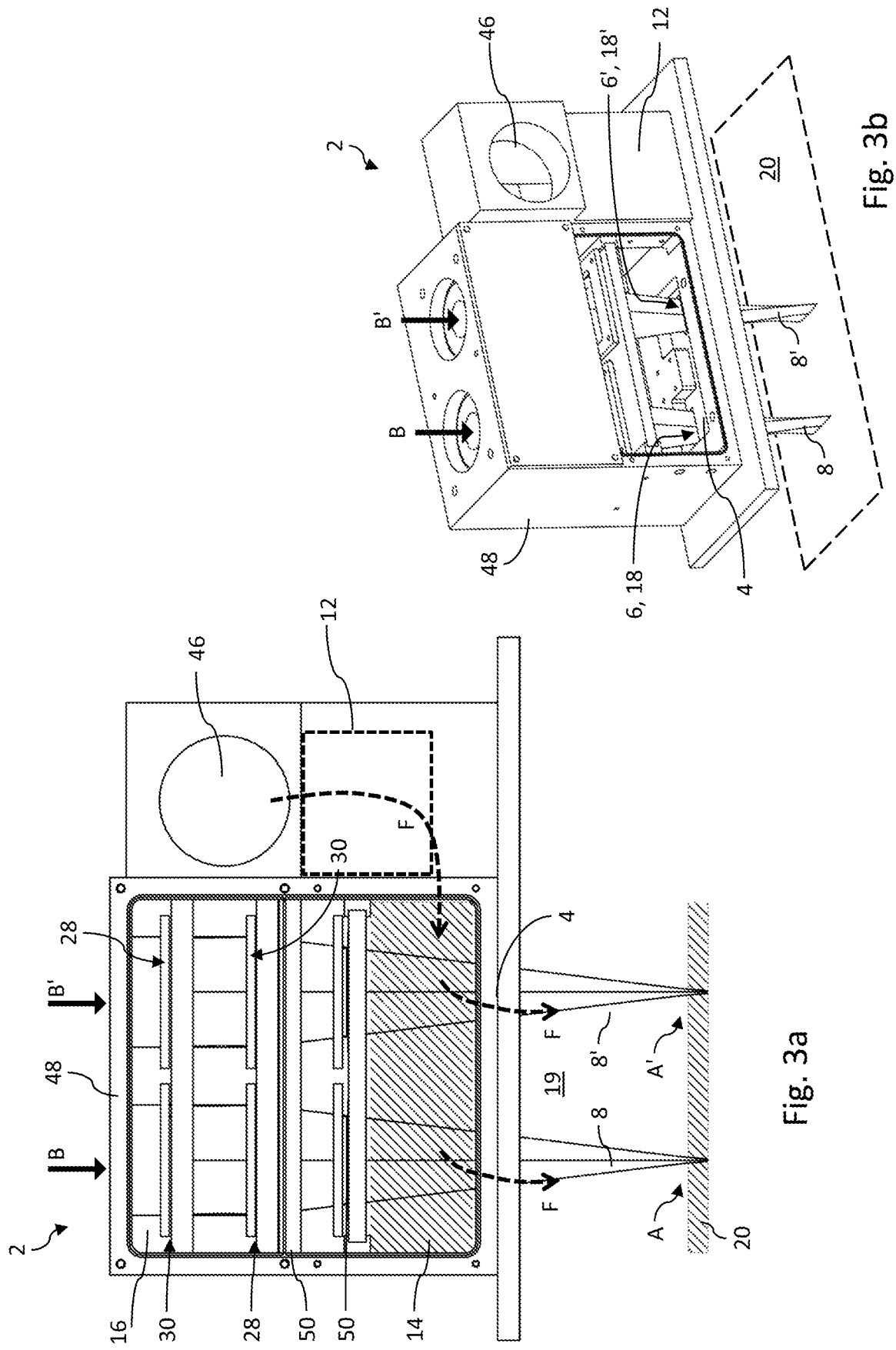

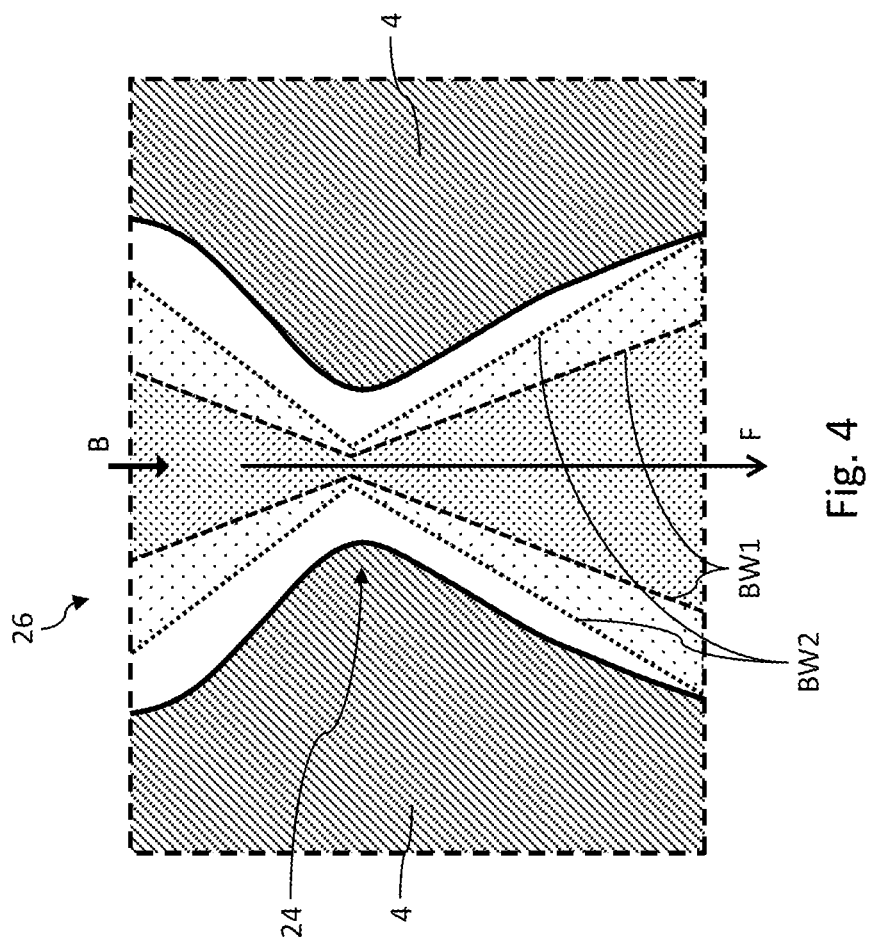

BEAM DELIVERY SYSTEM, METHOD, TRAIN AND TRANSPORT SYSTEM

CROSS-REFERENCE TO RELATED APPLICATIONS

This application claims priority to Netherlands Application No. 2023968, filed Oct. 4, 2019, the entire contents of which are herein incorporated by reference in its entirety.

The invention is related to laser beam delivery. A laser beam may for example be delivered in order to treat, e.g. clean, a surface, e.g. by laser ablation. As a side effect of such a treatment, by-products, e.g. including debris and/or evaporated material, are often formed at the surface, wherein the by-products can travel away from the surface and towards unwanted areas, for example towards one or more optical components. When by-products reach an optical component, e.g. a lens or a protective window, they can contaminate or even damage the component and/or occlude a laser beam path at the component, such that efficiency of the laser treatment is reduced and/or one or more components require replacement. For example, by-products can damage an optical component, altering its optical characteristics such as transmission, absorption and/or reflectance. Due to an increased absorption, the laser light will increasingly heat the optical component, possibly leading to fracture of the component. In particular, in practice, frequent replacement of a protective window (usually arranged in front of a beam exit opening) is often required, which is cumbersome and costly and can slow down the overall beam delivery process and/or treatment. It is therefore desired to prevent that such by-products can affect optical components associated with the beam delivery.

Various efforts have been made to address the above-mentioned problems. For example, US2003/0197909 discloses a method for preventing contamination of an optical element in an imaging head for imaging a media that produces imaging debris. The method comprises the steps of: collimating a source of pressurized fluid to produce a substantially non-turbulent fluid flow; and directing the non-turbulent fluid flow across an optical element such that the fluid flow forms a barrier between the optical element and the imaging debris. Because the fluid flow is merely directed across (i.e. along a surface of) the optical element, its effectiveness in keeping by-products (debris) away from the optical element is limited. Moreover, a large flow rate and flow speed are required to realize an appropriate buffer layer of flowing fluid. This can be prohibitively impractical depending on the specific application, e.g. depending on the speed of the by-products and the acceptable rate of replacing the optical element.

An object of the present invention is to solve at least one of the above mentioned problems. In particular, an object is to provide an improved beam delivery system and a method for treating a surface with a laser beam.

To this end, an aspect of the invention provides a beam delivery system according to the features of claim 1.

Advantageously, the system comprises a shield which includes at least one beam passage for transmission of at least one laser beam; an optics assembly configured to at least partly focus the at least one laser beam on the at least one beam passage; and means for providing a fluid flow through the at least one beam passage.

It will be appreciated that in the context of the present disclosure, 'at least partly focus' means that a laser beam is substantially concentrated, e.g. in the form of a point focus or a line focus or the-like, such that it transitions from substantially convergent to substantially divergent along at least one spatial dimension (but not necessarily along multiple spatial dimensions). By at least partly focusing the laser beam on the at least one beam passage, a large portion, e.g. substantially all, of the laser beam (i.e. of the beam's energy, e.g. energy intended for laser ablation) can reach a surface to be treated (the surface being arranged at a certain treatment distance behind the shield, facing the shield during operation). The shield can significantly limit exposure of the optics assembly to harmful by-products, e.g. ablated debris that emanates from a surface to be treated. By providing a fluid flow through the at least one beam passage, aforementioned by-products can be significantly or substantially prevented from travelling towards the optics assembly. The exposure of optics to such by-products can thus be complimentarily further reduced, thus limiting laser beam efficiency loss (e.g. due to occlusion) and increasing the functional lifetime of an optical element, e.g. a replaceable protective window of the optics assembly.

Focusing the laser beam onto the beam passage of the shield can in particular mean, that a respective focus point or focus line of the optics assembly is situated in the beam passage, preferably centrally (and on an optical axis of the beam e.g. extending centrally, preferably normally, through the beam passage). In this way, the beam passage can be relatively small, which advantageously improves protection of the optics assembly against by-products, while at the same time the laser beam can substantially travel through the beam passage.

Further, the shield as such is preferably made of material able to block laser light, e.g. secondary and/or tertiary light reflections resulting from a laser beam delivery to a target area.

The system is preferably (but not necessarily) configured for performing laser ablation using the at least one laser beam, because the invention finds particular benefit in laser ablation applications due to the prominent problem of by-product formation from laser ablation. It will however be appreciated that the invention can alternatively and/or additionally find benefit in other laser beam delivery applications including but not limited to laser heating, laser cleaning, laser cutting, laser welding and laser etching.

In an embodiment, the optics assembly is configured to partly focus the at least one laser beam on a first focal plane, the first focal plane having an intersection with the at least one beam passage. In particular, the beam passage can coincide with the first focal plane of the optics assembly.

The optics assembly may be further configured to partly focus the at least one laser beam also on a second focal plane which extends at a distance from the first focal plane and which is in particular spaced away from the at least one beam passage. The configuration is preferably such that the second focal plane extends at an opposite side of the first focal plane, viewed from the respective optics assembly (and viewed from the shield aperture). The two spaced-apart focal planes preferably extend in parallel with each other, but that is not required.

Thus, an asymmetric beam focus is achieved, using two mutually separate focal planes, providing significant advantages over prior art beam delivery systems. Such combined focusing of the laser beam on two focal planes, which extend at a distance from each other, enables that the laser beam can travel through a relatively narrow respective beam passage, while at the same time enabling that the laser beam can be sufficiently focused to provide a laser treatment, e.g. laser ablation, in an area, e.g. an ablation target area, which is spaced away from said beam passage (i.e. at the second focal plane). For example, the laser beam can be at least partly focused on a treatment target area.

It also follows that the beam passage can be spaced away from the treatment area, which can advantageously reduce the amount of by-products reaching the beam passage, as well as a speed at which such by-products reach said beam passage, taking into account speed loss due to e.g. friction and/or gravity.

In an embodiment, the system includes a first inner space and a separate second inner space, wherein the optics assembly is located in the first inner space, wherein the beam passage bounds the second inner space.

The first inner space may be kept substantially free from by-products which may be present in and/or produced in the second space, so that for example an optical element may be arranged in contact with the first space, or at least being located within the system, to keep the optical element substantially free from said by-products.

The separation can be significantly enhanced in case a fluid flow is induced in a direction from the first space to the second space (as will be explained below, e.g. by providing an overpressure in the first space with respect to a pressure in the second space).

In an embodiment, during operation, a fluid flow of fluid flowing via the beam passage is at least partially, and preferably controllably, directed towards a by-product target area so that beam delivery by-products are at least partially urged towards the by-product target area by the fluid flow.

Preferably, a direction from the beam passage to the by-product target area substantially corresponds to a movement direction of an object to be treated with respect to the system, in case of such a movement.

In case of such a relative movement, by-products produced due to the laser treatment process may have at least an initial velocity which at least partly corresponds to the relative movement. By directing the fluid flow as described, by-products may thus be targeted more effectively by such a fluid. More generally, by thus directing the fluid flow towards the by-product target area, by-products can advantageously be urged away from unwanted areas outside said target area. A controllable direction enables easy and effective adaptation to varying situations and circumstances, e.g. varying relative movement between object to be treated and system.

In an embodiment, a means for providing a fluid flow through the at least one beam passage are configured to provide a fluid pressure gradient between opposite sides of the shield (i.e. an inner side and an outer side), in particular a fluid pressure gradient along the at least one beam passage.

Such a fluid pressure gradient may effect an advantageous fluid flow through the at least one beam passage, in particular in a direction from a higher pressure area to a lower pressure area. For example, the gradient may be realized by increasing a pressure on one side of the shield, for example in an afore-mentioned first (internal) space. Alternatively, the gradient may be realized by decreasing a pressure in an afore-mentioned second (internal) space (with respect to an external, ambient pressure and/or with respect to a pressure in the first space).

In an embodiment, the means for providing a fluid flow through the at least one beam passage are configured such that the respective fluid flow is substantially directed in a main beam direction of the laser beam (i.e. in parallel with a respective optical axis), for example at a fluid flow velocity of at least 100 m/s, more preferably at least 200 m/s, for example about 250 m/s.

It has been found that such a fluid flow can substantially limit said by-products from traveling through the beam passage, in particular substantially preventing such by-products from reaching the optics assembly.

In an embodiment, the system further comprises at least one laser for generating the at least one laser beam (usually a collimated laser beam), to be transmitted via the beam passage by the optics assembly, wherein the at least one laser preferably includes at least one pulsed laser, for example having a laser wavelength of about 1064 nm.

Such a laser is particularly suited for laser treatment, in particular for laser ablation treatment and/or other high-power laser treatment.

In an embodiment, the at least one beam passage is elongated, wherein a length of the at least one beam passage is e.g. at least three times, preferably at least four times, more preferably at least five times, larger than a width of said passage. For example, the beam passage can be a (narrow) slit.

The elongated beam passage can enable a substantially line focused laser beam to travel through the passage, in particular when the beam's line focus is located in (coincides with) the beam passage. At the same time, a relatively small beam passage can be used (i.e. providing only a relatively small open area) so that most incoming by-products will reach a surrounding part of the shield.

In an embodiment, the optics assembly is configured to at least partly, preferably substantially, conform the at least one laser beam to the at least one beam passage (viewed in a cross-section that is normal to an optical axis of the beam).

Thus, a substantially close fit may be provided between beam passage and the laser beam at the beam passage (viewed in a cross-section that is normal to an optical axis of the beam), so that the laser beam may substantially pass through the beam passage.

In an embodiment, the at least one beam passage includes or is configured to provide a constriction in a fluid flow path through the beam passage, wherein in particular the beam passage includes and/or is part of a convergent-divergent nozzle, in particular a de-Laval type nozzle.

Such a constriction can enable that a fluid flow speed in the fluid flow path is increased, in particular downstream of the constriction. An increased fluid flow speed can provide improved repulsion of by-products out of and/or away from the beam passage.

The optics assembly can be configured in various ways, and can include one or more optical elements (e.g. being separate optical elements, or optical elements being integrated with each other, or a single optical element providing different beam shaping functions).

Preferably, the optics assembly comprises, preferably for each laser beam of the at least one laser beam:
  a first optical unit, e.g. a lens or a mirror or a set of lenses and/or mirrors, for focusing the laser beam with respect to a first spatial direction which is substantially transverse (orthogonal) to a second spatial direction, wherein a main focal length of the first optical unit substantially corresponds to a distance between the first optical unit and the respective beam passage; and
  a second optical unit, e.g. a lens or a mirror or a set of lenses and/or mirrors, for focusing the laser beam with respect to the second spatial direction, wherein a main focal length of the second optical unit substantially corresponds to a distance between the second optical unit and a treatment area.

In this way, the laser beam can be focused on the beam passage, while the laser beam can also be focused on the treatment area, i.e. spaced away from the beam passage.

The main focal length of the second optical unit is preferably substantially large compared to the main focal length of the first optical unit, so that a distance between the respective foci of the first and second optical units can be large compared to a distance between the first and second optical units. In this way, the shield can be spaced away from the treatment area while the optics assembly can be relatively compact.

In an embodiment, at least one, preferably each, of the first and second optical units is configured to produce a line focus. To that aim e.g. the optical unit can include a substantially cylindrical lens or cylindrical mirror.

Such a configuration enables that the laser beam can be focused at each of two different focal planes, e.g. without any optical elements in between the two different focal planes, in particular when the line foci are oriented substantially perpendicular to each other (i.e. at an angle of 90 degrees).

In an embodiment, the system is configured to emit gas, e.g. a jet of gas, preferably towards a treatment area, e.g. to remove liquid, e.g. rain water, from the treatment area. For example, the gas can be emitted via the laser beam passage of the shield.

Effectiveness and/or efficiency of the beam delivery can be improved, wherein the emitted gas can dry the treatment area by removal of liquid. Such liquid (when present) could have otherwise been subject to the laser treatment process, thus taking up laser treatment energy. In other words, by removing liquid in this way, the beam delivery for the laser treatment of any remaining material can be more effective and/or efficient.

In an embodiment, the system includes a cover means that is configured to substantially close off or cover a space which includes a treatment area. For example, during use, a vent can be provided, e.g. between the cover means and an object to be treated, for venting gas, e.g. air, from said substantially closed-off space.

Such cover means can contribute to laser safety by blocking and/or absorbing laser light, e.g. scattered laser light. Also, the cover means can be configured to provide a vent, e.g. to enables that liquid (if any) can be removed by a flow of gas (rather than e.g. being retained in the substantially closed off space).

In an embodiment, the or each beam passage, in particular a respective relatively narrow width thereof, is dimensioned to conform to a respective beam width of the or each respective laser beam, in particular a beam width in the range from the $1/e^2$ beam width to the 99.99% intensity beam width.

It has been found that such a configuration provides an advantageous trade-off between allowing a large portion of the laser beam to pass through the passage on the one hand and protection against by-products on the other hand.

In an embodiment, the system includes a plurality of, e.g. two, beam passages which are associated with a respective plurality of laser beams.

The plurality of laser beams and passages may be arranged such that respective treatment areas of the laser beams complement each other, e.g. by together forming a larger treatment area or set of treatment areas. In this way, laser treatment processes may be sped up and/or larger objects may be treated.

In an embodiment, the system is configured for treating, in particular cleaning, a surface, in particular a running surface, of a rail of a railway track, wherein the system is configured to be mounted on a train which can run on the track and to treat the surface while the train is, preferably runs, on the track.

In an embodiment, the system (e.g. a respective cover means) is configured to at least partly, preferably substantially, enclose a head section of the rail during operation.

A particularly advantageous embodiment provides a train for treating, in particular cleaning, at least one rail, preferably two rails, of a railway track on which the train can run, wherein the train is provided with at least one beam delivery system as described above, preferably at least one respective system for each rail to be treated. In particular, the system can be arranged for treating an upper side of the rail (i.e. a rail surface that directly contacts a train wheel during operation).

Another particularly advantageous embodiment provides a transport system for operating a train service, wherein the transport system comprises a railway track or a network of railway tracks and at least one train as described above for treating one or more rails of the railway track or the network of railway tracks.

Another aspect of the invention provides a beam delivery method, comprising: transmitting at least one laser beam through a respective at least one beam passage of a shield; at least partly focusing the at least one laser beam on the at least one beam passage; and providing a fluid flow through the at least one beam passage.

Such a method can provide the above-mentioned advantages.

In an embodiment, a method of treating, in particular cleaning, at least one rail, preferably two rails, of a railway track, is provided, the method comprising: providing, on the track, a train as described above; and performing a beam delivery method as described above, wherein the at least one laser beam is preferably directed at the at least one rail, in particular at a running surface of said rail.

In an embodiment, the method further comprises removing liquid, e.g. rain water, from the at least one rail, in particular from the running surface of said rail, by a flow of gas, e.g. air.

In an embodiment, a method of operating a train service is provided, wherein the method comprises: providing a transport system as described above; and preforming a method as described above for treating at least one rail of a railway track of the transport system.

The invention will be explained further with reference to exemplary embodiments and drawings. In the drawings:

FIG. 1a schematically shows a cross sectional of part of a beam delivery system according to a non-limiting embodiment of the invention;

FIG. 1b shows a cross section over line II-II of FIG. 1;

FIG. 3a shows a partly opened side view of a beam delivery system according to a further embodiment;

FIG. 3b shows a partly opened isometric view of the beam delivery system of FIG. 3a;

FIG. 3c shows a top view of a beam delivery area provided by an example of the beam delivery system as in FIG. 3a;

FIG. 4 shows a cross section of a nozzle of a beam passage of a beam delivery system, in detail, according to an embodiment;

The drawings are schematic. In the drawings, similar or corresponding elements have been provided with similar or corresponding reference signs.

Figure 2:
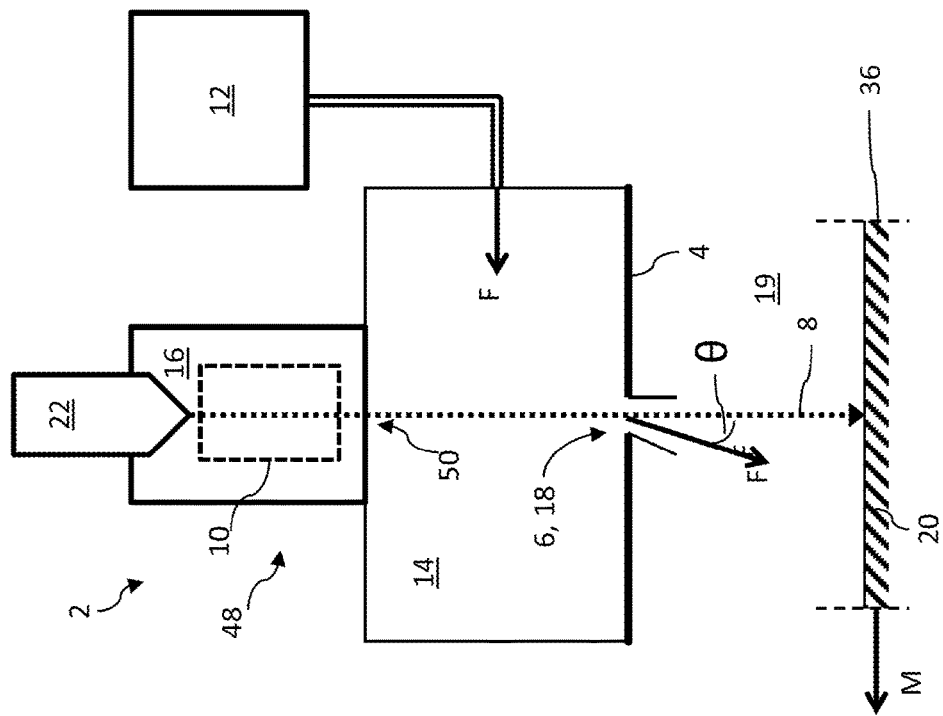
FIG. 2 shows a diagrammatic representation of the beam delivery of FIG. 1.

FIGS. 1a, 1b, 2 depict a beam delivery system 2, configured to carry out a laser treatment (i.e. laser beam cleansing) of a surface of an object 20. The object 20 to be treated can be or be part of many different types of objects, made of many different materials, as will be appreciated by the skilled person. Thus, the invention is not limited to treatment of railway parts or rails (i.e. the embodiment described below).

The system 2 comprises a laser device 22 (see FIG. 2) for generating the laser beam 8, to be transmitted through an open laser beam passage 6 of a shield 4 by an optics assembly 10. The laser device 22 can be configured in various ways; good results can be achieved e.g. in case the laser device includes at least one pulsed laser, in particular having a laser wavelength of about 1064 nm. It is preferred that the laser device 22 is configured to generate a collimated (high power) laser beam.

The shield 4 as such can also be configured in various ways. It is preferred that the shield 4 is durable and sturdy, in particular robust against incoming debris.

In the embodiment of FIGS. 1, 2, a single laser beam passage 6 is provided in the shield 4 (for transmission of a single laser beam). Alternatively, as shown in FIGS. 3, 5, the shield 4 can be provided with a plurality of, e.g. two, beam passages 6, 6' which are associated with a respective plurality of laser beams 8, 8'.

Figure 1C:
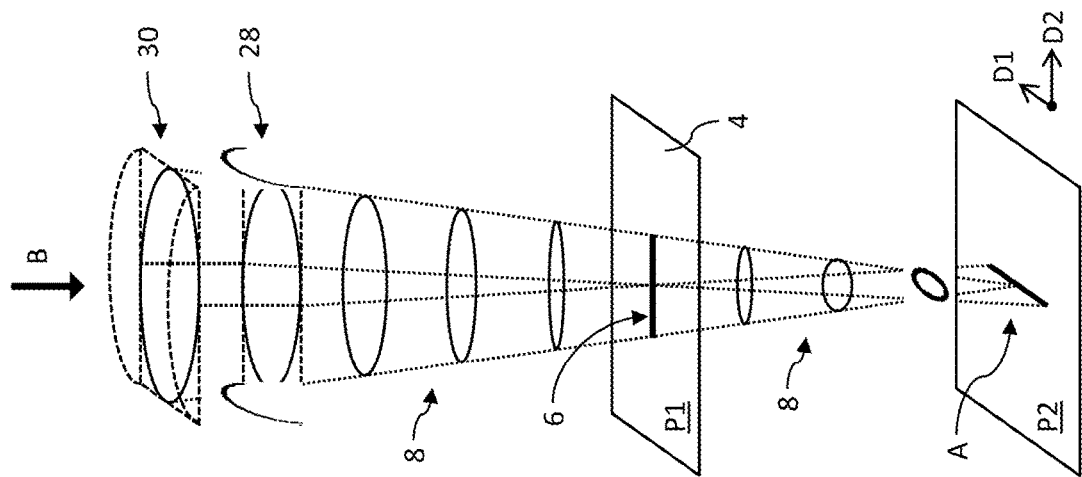
FIG. 1c shows an isometric view of a geometry of a laser beam and an optics system of the beam delivery system according to an embodiment.

In order to provide good beam delivery, the system (i.e. its optics assembly) is configured to focus the laser beam 8 onto the surface of the object 20 to be treated (see FIGS. 1a, 1c). In this example, advantageously, the beam 8 is only partly focused onto that surface, as follows from FIG. 1b, i.e. no point focus is applied.

Also, as follows from FIG. 1b, 1c, the system (i.e. optics assembly 10) is also configured to focus the laser beam 8 on the elongated beam passage 6 (i.e. a respective focus is located in the passage 6); again, no point focus is applied (as follows from the additional focusing onto the object 20 to be treated).

In particular (see FIGS. 1a, 1b), the optics assembly 10 is configured to partly focus the laser beam 8 on a first focal plane P1 which has an intersection with the at least one beam passage 6. In the present example, the first focal plane P1 extends in parallel with and coincides with the shield 4.

The optics assembly 10 is further configured to partly focus the laser beam 8 on a second focal plane P2, located externally of the system, the second focal plane P2 extending at a distance from the first focal plane P1 and which is in particular spaced away from the at least one beam passage 6. In the present example, the second focal plane P2 extends in parallel with the first focal plane P1. As follows from the drawings, the second focal plane P2 is located at an opposite/outer side of shield 4, to coincide with the surface of the object 20 to be treated during operation. In a preferred embodiment, the system is configured to maintain focus, e.g. utilizing autofocus and respective autofocus components, as will be appreciated by the skilled person, in order to maintain focus onto the object 20 in case of variation of a distance between that object and the beam delivery system 2 during operation.

The optics assembly can be configured in various ways to achieve the double focusing of the laser beam. As is shown in the drawings, the optics assembly 10 can comprise e.g. at least a first optical unit 28, e.g. a lens or a mirror or a set of lenses and/or mirrors, to provide a partial focus onto the first focal plane P1. In this example the first optical unit 28 is configured for focusing the laser beam 8 with respect to a first spatial direction D1 (which extends in parallel with the first focal plane P1). A main focal length of the first optical unit substantially corresponds to a distance S1 between the first optical unit 28 and the respective beam passage 6 (see FIG. 1b).

Further there is provided a second optical unit 30, e.g. a lens or a mirror or a set of lenses and/or mirrors, for focusing the laser beam 8 partly onto the second focal plane P2, with respect to a second spatial direction D2 (that is in parallel with the second focal plane P2). A main focal length of the second optical unit substantially corresponds to a distance S2 between the second optical unit 30 and a respective treatment area A that is located in the second focal plane P2.

It is preferred that the first spatial direction D1 is substantially transverse to the second spatial direction D2. It is also advantageous in case each, of the first and second optical units 28, 30 is configured to produce a respective line focus. To that aim, for example, the respective optical unit 28, 30 can including a substantially cylindrical lens (as in the drawings) or cylindrical mirror, i.e. cylindrical optics, as will be appreciated by the skilled person.

In the present examples, each laser beam passage 6, 6' is an elongated slit/aperture. A length L of each laser beam passage 6 (see FIG. 3c) can e.g. be at least three times, preferably at least four times, more preferably at least five times, larger than a width W of said passage 6.

It follows that in particular, the present optics assembly 10 is configured to at least partly, preferably substantially, conform the laser beam 8 (i.e. its shape, viewed in cross-section) to the respective beam passage 6. In other words, the laser beam passage 6, in particular a respective relatively narrow width W thereof, can e.g. be dimensioned to conform to a respective beam width of the incoming respective laser beam 8, in particular a beam width in the range from the 1/e2 beam width BW1 to the 99.99% intensity beam width BW2.

Advantageously, as follows from the drawings, the system (e.g. a housing 48 or wall structure thereof) includes several inner spaces 14, 16 or chambers, through which the beam 8 passes from the laser device 22 to the respective beam passage in the shield 4. A first inner space 14 is provided, bounded by the external shield 4, and a second inner space 16 that includes the optics 28, 30, wherein the first and second inner space 14, 16 are separated, e.g. by an intermediate wall 15.

The beam passage 6 provides a respective fluid connection 18 from the first space 14 into the external space 19 (i.e. externally of the shield 4 c.q. system 2).

A protective transparent gas-tight internal shield 50 is located between the first and second inner space 14, 16, the transparent gas-tight shield (e.g. made of glass, optical glass) allowing passage of the laser beam 8 from the second inner space 16 into the first inner space 14.

The present system 2 is configured to emit gas, e.g. a jet of gas, preferably towards the treatment area A, in particular via the laser beam aperture 6, to prevent or reduce chances of entry of debris into the system.

The present example is provided with means 12 for providing a fluid flow F through the outer laser beam passage 6, in this case from the first internal space 14 to the environment 19

In particular, the means 12 for providing a fluid flow F through the beam passage 6 are configured to provide a fluid pressure gradient between opposite sides of the shield 4, in particular a fluid pressure gradient along the beam passage 6. To this aim, such means 12 can include e.g. a pump of pumping system 12, a fan, ventilator (in case the fluid F is gas or air) or the-like, configured to provide a positive, higher pressure in the first inner space 14 with respect to ambient (atmospheric) pressure. Alternatively, such means can be configured for sucking ambient air into the system, i.e. for providing a lower internal pressure in the first inner space 14 with respect to ambient pressure.

In a preferred embodiment, the means 12 for providing a fluid flow F through the laser beam passage 6 are configured such that the provided fluid flow F is substantially directed in a main beam direction B of the laser beam 8 (i.e. optical axis) at the passage 6, preferably at a main flow velocity of at least 100 m/s, more preferably at least 200 m/s, for example about 250 m/s.

As is shown in FIG. 2, also, in an embodiment, during operation, a fluid flow of fluid flowing through the beam passage 6 is at least partially, and preferably controllably, directed towards a by-product target area so that beam delivery by-products are at least partially urged towards the by-product target area by the fluid flow. The fluid flow e.g. encloses an angle θ with the optical axis of the laser beam 8, for example an angle θ in the range of 1-30 degrees.

A direction from the beam passage to the by-product target area may substantially correspond to a movement direction M of an object to be treated with respect to the system 2, in case of such a movement.

It is preferred that the external laser beam passage 6 includes or provides a constriction 24 in a fluid flow path through the beam passage 6. As is shown in FIG. 4, to that aim in particular the beam passage 6 includes and/or is part of a convergent-divergent nozzle 26, in particular a de-Laval type nozzle.

Figure 5B:
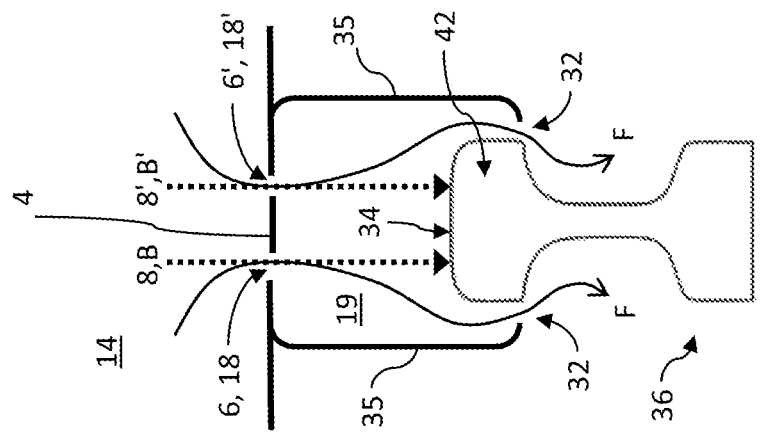
FIG. 5b shows a schematic cross-section of operation of the system over line V-V of FIG. 5a, with a cover means.
Figure 5A:
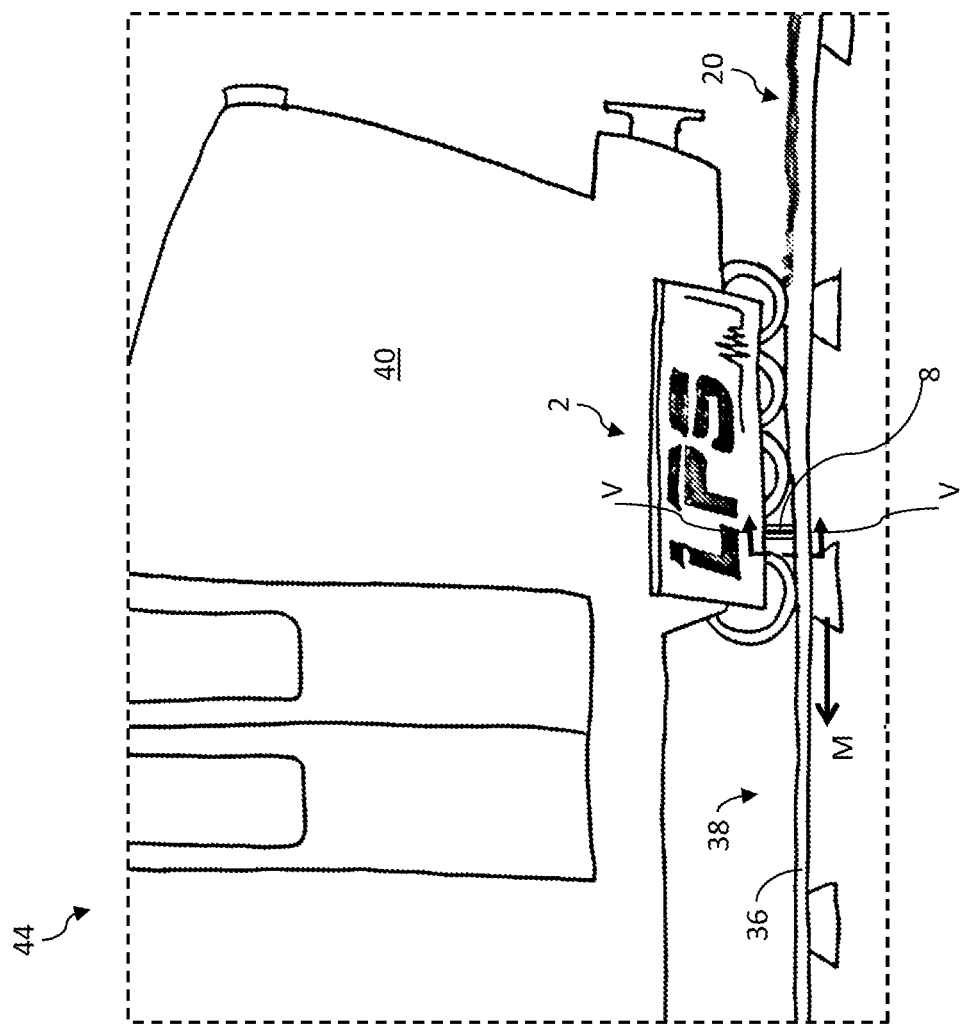
FIG. 5a shows a side view of a system for operating a train service according to an embodiment, without showing a cover means.

In a preferred embodiment, (see FIG. 5b, the system can include a cover means 35 that is configured to substantially close off or substantially cover a space which includes a treatment area A. Such a cover 35 can be made of non-transparent material, and allows for bystander safety (avoiding stray laser light reading any bystanders). Besides, such a cover 35 can enhance fluid flow effects, concentrating ejected fluid F onto or towards the treatment area A.

As follows from FIGS. 1-2, during operation, the system can carry out a method wherein the laser device 12 generates a laser beam 8. At the same time, a fluid flow F is generated by the respective fluid flow generating means 12. The laser beams 8 and fluid F exit the system via the elongated laser beam aperture (slit) 6, towards the surface to be treated. The laser beam 8 is being line-focused onto the elongated aperture 6 so that it substantially (preferably entirely) passes that aperture. Next, the laser beam line-focuses onto the surface (at the respective second focal plane P2), to carry out a surface treatment. Debris that scatters from the treated surface has no or little chance of reaching the internal optics 28, 30 of the system due to the application of the shield 4 having the (relatively small, narrow) laser beam slit in combination with application of the fluid ejection.

Figure 3C:
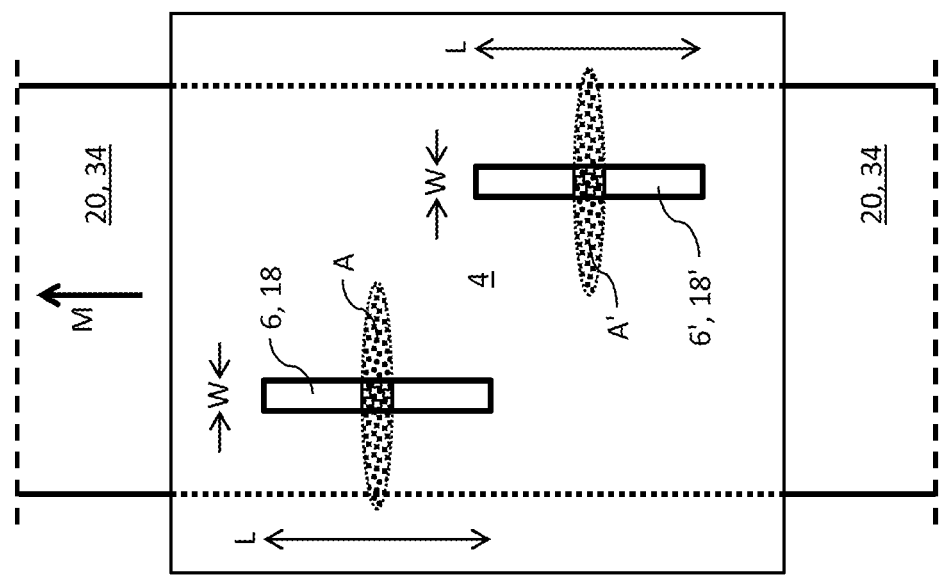

FIGS. 3a, 3b, 3c show a further advantageous example of the system 2, wherein it includes two arrays of optical elements 28, 28', 30, 30' for directing and focusing the respective laser beams 8, 8' in the same manner as described above. In this way, two respective treatment areas A, A' can be treated, as is shown in FIG. 3c. Further, FIG. 3a, 3c show application of an air inlet 46 located upstream of a fluid flow generator 12 (e.g. fan or air pump), for intake of ambient air that is to serve as fluid F to be ejected again via the first inner chamber 14 and laser beam slits 6, 6'. As follows from FIG. 3c, in this case, each beam passage 6, 6' provides a respective fluid connection 18, 18' from the first space 14 into the external space 19. Also, as follows from FIG. 3a, preferably, the two line-focused beams provide located substantially non-overlapping laser beam treatment areas A, A' in the second focal plane. Moreover, again, a direction of movement M of the system 2 with respect to the object 20 to be treated is preferably perpendicular with respect to the line-focused laser beam treatment areas A, A', and is preferably in parallel with respect to center lines of the (in this case two) respective laser beam slits 6, 6'

The system 2 can be configured or implemented for treating, in particular cleaning, a surface. The surface can e.g. be a running surface 34, of a rail 36 of a railway track 38 of a transport system 44, see FIGS. 5a, 5b. In that case, the system 2 is preferably configured to be mounted on a train 40 (e.g. at a lower side or part of the train, facing a rail to be treated) which can run on the track 38, so that the system can treat the rail surface while the train 40 is, and preferably runs/moves, on the track 38. As is shown, the system can be configured to at least partly, preferably substantially, enclose a head section 42 of the rail 36 during operation, via an afore-mentioned cover or cover means 35. Thus, an embodiment also can provide a train 40 for treating, in particular cleaning, a rail 36, preferably two rails, of a railway track 38 on which the train 40 can run, in which case the train 40 is provided with one or more beam delivery systems 2 as described above.

Thus, use of the system 2 or a plurality of such systems 2 can include a method of treating, in particular cleaning, at least one rail 36, preferably two rails, of a railway track 38, in which case the at least one laser beam 8 can be directed to each rail 36 to be cleansed. In a preferred embodiment, the method further comprises removing liquid, e.g. rain water, from the at least one rail (36), in particular from the running surface 34 of said rail 36, by a flow of gas, e.g. air.

In this way, efficient and reliable surface treatment can be achieved, the system having a long durability and low downtimes. In particular, the system can operate under various weather conditions, and can cope very well wit with both dry and wet surfaces.

The embodiments as disclosed are shown by way of example only and should not be construed as limiting the scope of the disclosure. Many variations are possible within the scope of the invention as defined by the claims.

For example, the at least one laser beam may be focused on the at least one laser beam passage in multiple, e.g. two, spatial dimensions, wherein the optics assembly may be configured to e.g. produce a substantially point or circular type of focus of the at least one laser beam at the at least one beam passage.

Thus, one of the first and second optical units 28, 30 can be configured to produce a line focus, wherein the other of the first and second optical units 28, 30 can be configured to produce a point focus.

Also, it should be observed that the system is optionally configured to focus the laser beam onto a target area but that is not required.

LIST OF REFERENCE SIGNS

2. Beam delivery system
4. Shield
6. Beam passage

8. Laser beam
10. Optics assembly
12. Means for providing a fluid flow through the at least one beam passage
14. First space
16. Second space
18. Fluid connection from the first space to the second space
20. Object to be treated
22. Laser
24. Constriction in a fluid flow path through the beam passage
26. Convergent-divergent nozzle
28. First optical unit
30. Second optical unit
32. Vent
34. Running surface
35. Cover
36. Rail
38. Railway track
40. Train
42. Head section of the rail
44. Transport system
46. Air inlet
48. Housing
50. Protective gas-tight transparent shield
A. Treatment area
B. Main beam direction of the laser beam
BW1. $1/e^2$ beam width
BW2. 99.99% intensity beam width
D1. First spatial direction
D2. Second spatial direction
F. Fluid flow
L. Length of the at least one beam passage
M. Direction in which, during operation, an object to be treated moves with respect to the system
P1. First focal plane
P2. Second focal plane
S1. Distance between the first optical unit and a treatment area
S2. Distance between the second optical unit and the respective beam passage
W. Width of the at least one beam passage

The invention claimed is:

1. A beam delivery system, comprising:
a shield which includes at least one beam passage for transmission of at least one laser beam, wherein the at least one beam passage is elongated, wherein a length of the at least one beam passage is at least three times larger than a width of said at least one beam passage;
an optics assembly;
at least one laser for generating the at least one laser beam to be transmitted through the at least one beam passage by the optics assembly, and
a pump for providing a fluid flow through the at least one beam passage,
wherein the beam delivery system is configured for performing laser ablation using the at least one laser beam,
wherein the optics assembly comprises, for each laser beam of the at least one laser beam:
a first optical unit for focusing the laser beam with respect to a first spatial direction, wherein a main focal length of the first optical unit substantially corresponds to a distance between the first optical unit and the respective beam passage to define a first focal plane at the respective beam passage, and
a second optical unit for focusing the laser beam with respect to a second spatial direction which is substantially transverse to the first spatial direction, wherein a main focal length of the second optical unit substantially corresponds to a distance between the second optical unit and a treatment area to define a second focal plane at the treatment area, the second focal plane being at an opposite side of the first focal plane from the optics assembly comprising the first and second optical units,
wherein each of the first and second optical units is configured to produce a line focus and includes a substantially cylindrical lens or mirror.

2. The beam delivery system according to claim 1, including a first inner space and a separate second inner space and a separate second inner space, wherein the optics assembly is located in the first inner space, wherein the at least one beam passage bounds the separate second inner space.

3. The beam delivery system according to claim 1, wherein during operation, the fluid flow of fluid flowing through the at least one beam passage is at least partially directed towards a by-product target area so that beam delivery by-products are at least partially urged towards the by-product target area by the fluid flow,
wherein a direction from the at least one beam passage to the by-product target area substantially corresponds to a movement direction of an object to be treated with respect to the beam delivery system, in case of such a movement.

4. The beam delivery system according to claim 1, wherein the pump for providing the fluid flow through the at least one beam passage is configured to provide a fluid pressure gradient between opposite sides of the shield and/or along the at least one beam passage.

5. The beam delivery system according to claim 1, wherein the pump for providing the fluid flow through the at least one beam passage is configured such that the provided fluid flow is substantially directed in a main beam direction of the laser beam at a main flow velocity of at least 100 m/s.

6. The beam delivery system according to claim 1, wherein the at least one laser includes at least one pulsed laser.

7. The beam delivery system according to claim 1, wherein:
the optics assembly is configured to at least partly conform the at least one laser beam to the at least one beam passage; and/or
the at least one beam passage or each beam passage, in a respective relatively narrow width thereof, is dimensioned to conform to a respective beam width of the at least one laser beam or each respective laser beam, in a beam width in the range from the 1/e2 beam width to the 99.99% intensity beam width.

8. The beam delivery system according to claim 1, wherein the at least one beam passage includes or provides a constriction in a fluid flow path through the at least one beam passage, wherein the at least one beam passage includes and/or is part of a convergent-divergent nozzle.

9. The beam delivery system according to claim 1, wherein the beam delivery system is configured to emit gas towards the treatment area.

10. The beam delivery system according to claim 1, wherein the beam delivery system includes a cover that is configured to substantially close off or substantially cover a space which includes the treatment area.

11. The beam delivery system according to claim 1, including a plurality of beam passages which are associated with a respective plurality of laser beams.

12. The beam delivery system according to claim 1, wherein the beam delivery system is configured for treating, or cleaning, a surface of a rail of a railway track, wherein the beam delivery system is configured to be mounted on a train which can run on the railway track and to treat the surface while the train is on the railway track,
   wherein the beam delivery system is configured to at least partly enclose a head section of the rail during operation.

13. A train for treating, or cleaning, at least one rail of a railway track on which the train can ran, wherein the train is provided with at least one beam delivery system according to the beam delivery system of claim 12.

14. A transport system for operating a train service, wherein the transport system comprises the railway track or a network of railway tracks and at least one train according to claim 13 for treating one or more rails of the railway track or the network of railway tracks.

15. A method of treating, or cleaning, at least one rail of at least one railway track, the method comprising:
   providing, on the at least one railway track, the train according to claim 13; and
   performing a beam delivery method using the at least one beam delivery system, wherein the at least one laser beam is directed at the at least one rail,
   wherein the method further comprises removing liquid from the at least one rail by a flow of gas.

16. A method of operating the train service according to claim 14, wherein the method comprises:
   providing the transport system; and
   performing a method for treating the at least one rail of the railway track of the transport system.

* * * * *